United States Patent

Rozema et al.

[19]

[11] Patent Number: 5,855,934
[45] Date of Patent: Jan. 5, 1999

[54] VALVE PIN ACTUATOR

[75] Inventors: Henry I. Rozema, Brampton; Robert F. Rick, Weston, both of Canada

[73] Assignee: Tradesco Mold Limited, Rexdale, Canada

[21] Appl. No.: 863,134

[22] Filed: May 27, 1997

[51] Int. Cl.[6] .................................................. B29C 45/23
[52] U.S. Cl. ..................... 425/562; 264/328.9; 425/564; 425/566
[58] Field of Search .................................. 425/562, 563, 425/564, 565, 566; 264/328.9

[56] References Cited

U.S. PATENT DOCUMENTS

| | | | |
|---|---|---|---|
| 4,013,393 | 3/1977 | Gellert | 425/245 |
| 4,082,226 | 4/1978 | Appleman et al. | 425/564 |
| 4,286,941 | 9/1981 | Gellert | 425/566 |
| 4,478,780 | 10/1984 | Kim | 264/328.2 |
| 4,712,995 | 12/1987 | Basnett | 425/562 |
| 4,755,131 | 7/1988 | Schmidt | 425/549 |
| 4,793,794 | 12/1988 | Kaaden | 425/549 |
| 4,793,795 | 12/1988 | Schmidt et al. | 425/549 |
| 4,834,294 | 5/1989 | Herzog | 239/584 |
| 4,836,766 | 6/1989 | Gellert | 425/549 |
| 4,917,593 | 4/1990 | Gellert | 425/549 |
| 4,923,387 | 5/1990 | Gellert | 425/566 |
| 5,049,062 | 9/1991 | Gellert | 425/549 |
| 5,067,893 | 11/1991 | Osuna-Diaz | 425/564 |
| 5,378,138 | 1/1995 | Onuma et al. | 425/549 |
| 5,387,099 | 2/1995 | Gellert | 425/564 |
| 5,511,968 | 4/1996 | Guzzini et al. | 425/564 |

*Primary Examiner*—Tim Heitbrink
*Attorney, Agent, or Firm*—Rogers & Milne

[57] ABSTRACT

A valve pin actuator for a valve-gated injection molding system. The actuator has an annular piston mounted in and movable back and forth along an annular bore along a pin axis. The piston extends radially outwardly of any melt passages fluidly communicating with an injection molding nozzle. A tie bar extends substantially diametrically across the piston for securing an upper end of a valve pin extending into the injection molding nozzle to cause the valve pin to move axially with the piston thereby moving the valve pin between open and shut positions.

3 Claims, 5 Drawing Sheets

VALVE PIN ACTUATOR

FIELD OF THE INVENTION

The invention relates generally to valve pin actuators for a valve-gated injection molding system and more particularly to valve pin actuators for single cavity molds having a melt inlet generally opposite an outlet end of an injection nozzle.

BACKGROUND OF THE INVENTION

Injection molding nozzles which utilize a concentric pin or rod (a "valve pin") to shut off melt flow require an actuator to move the pin axially back and forth along a pin axis to open and close the melt nozzle. This can be problematic in single cavity molds where the melt inlet is generally opposite the outlet end of the nozzle. In such an arrangement, it is necessary to actuate the valve pin while diverting melt flow around the valve pin.

U.S. Pat. No. 4,729,733 (Schmidt) is illustrative of a prior art solution addressing the above problem. The Schmidt arrangement divides melt flow from a central inlet into two branches which extend around a centrally mounted hydraulic actuator and recombine below the actuator.

The Schmidt arrangement has numerous shortcomings. Firstly, the limited amount of space available restricts piston size requiring the use of a hydraulic actuator which is undesirable because of the possibility of hydraulic fluid leaking past the valve pin, thereby contaminating the melt.

Secondly, because of the proximity of the actuator to the branches (which act as a conduit for hot melt) and the inability to provide adequate cooling in the hot, restricted location, seal wear is problematic.

Additionally, the height of the Schmidt arrangement makes it undesirable for stack molds, particularly multi-level stack molds.

It is an object of the present invention to provide a valve pin actuator which is not restricted to a size which will fit within the centralized location required by the Schmidt arrangement.

It is a further object of the present invention to provide a valve pin actuator having a piston size large enough to allow the use of pneumatic actuation.

It is a still further object of the present invention to provide a valve pin actuator having a piston, the location of which is not surrounded by hot melt, thereby avoiding heat damage to any seals.

It is also an object of the present invention to provide a valve pin actuator having a relatively low height to enable its use in stack mold arrangements.

SUMMARY OF THE INVENTION

A valve pin actuator for a valve-gated injection molding system having an injection molding nozzle and a generally co-axial valve pin extending along an inner bore of said nozzle, said valve pin being movable relative to said nozzle along a pin axis between open and shut positions, said valve pin actuator comprising:

an annular piston mounted in and movable, by pneumatic pressure, back and forth along an annular bore in a direction generally parallel to said pin axis, said annular piston extending radially outwardly of any melt passages which fluidly communicate with said injection molding nozzle; and, an actuator bar extending substantially diametrically across said annular piston, said actuator bar having a connector for connecting an upper end of said valve pin thereto to move said valve pin back and forth along with said annular piston between said open and shut positions.

DESCRIPTION OF DRAWINGS

Preferred embodiments of the invention are described below with reference to the accompanying drawings in which.

DESCRIPTION OF PREFERRED EMBODIMENTS

Figure 1:
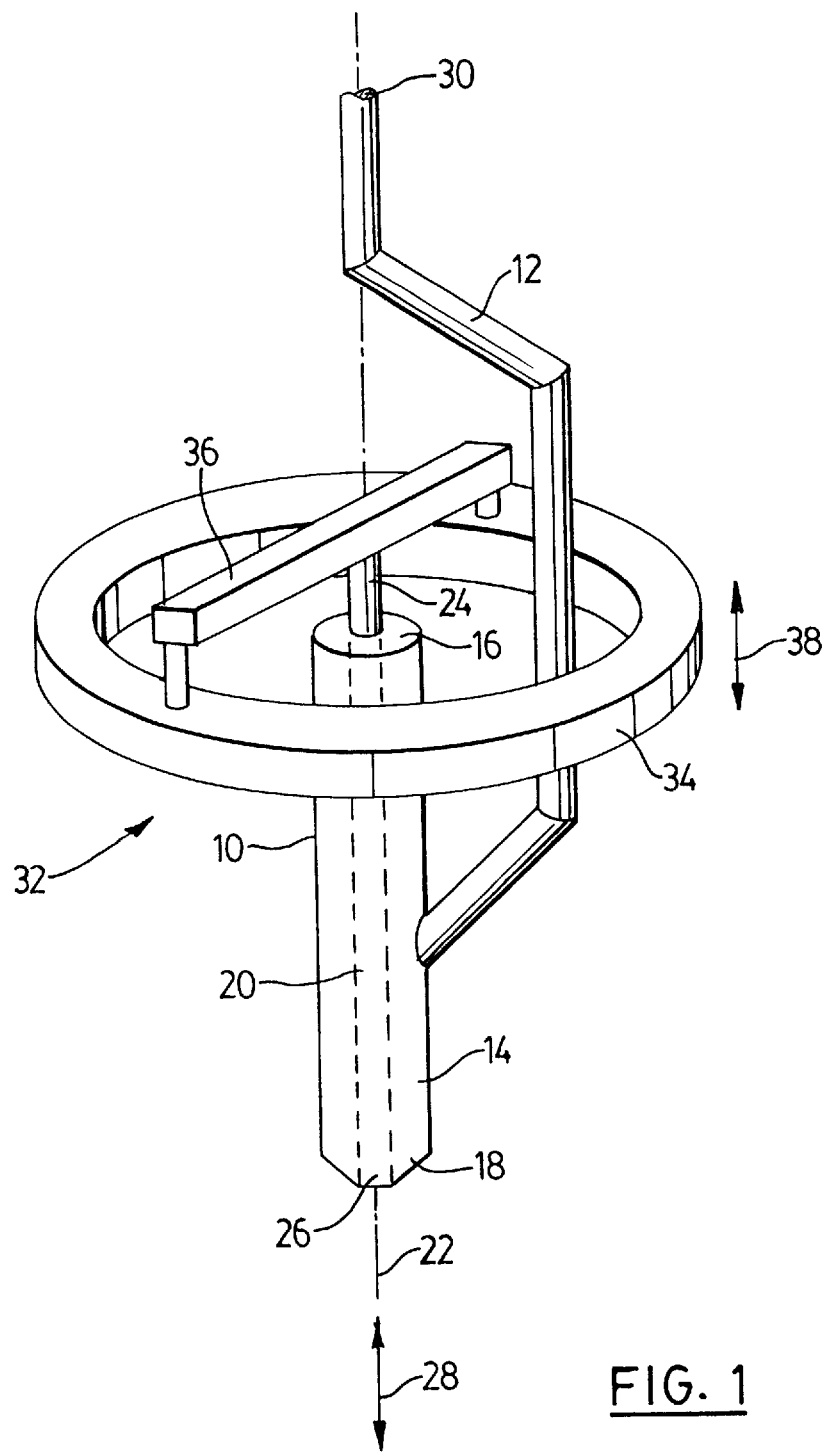
FIG. 1 is a diagrammatic view illustrating the relative juxtaposition of a piston and actuator bar according to the present invention relative to an injection molding nozzle and melt passage.

FIG. 1 illustrates a typical injection molding nozzle 10 which receives molten plastic or "melt" from a melt passage 12. The nozzle 10 has a generally cylindrical bore 14 extending between an outer end 16 and a nozzle tip 18 of the nozzle 10. A generally cylindrical valve pin 20 having a pin axis 22 extends axially through the bore 14. The valve pin 20 has an upper end 24 extending from the outer end 16 of the nozzle 20 and a lower end 26 terminating approximately at the nozzle tip 18.

Figure 2:
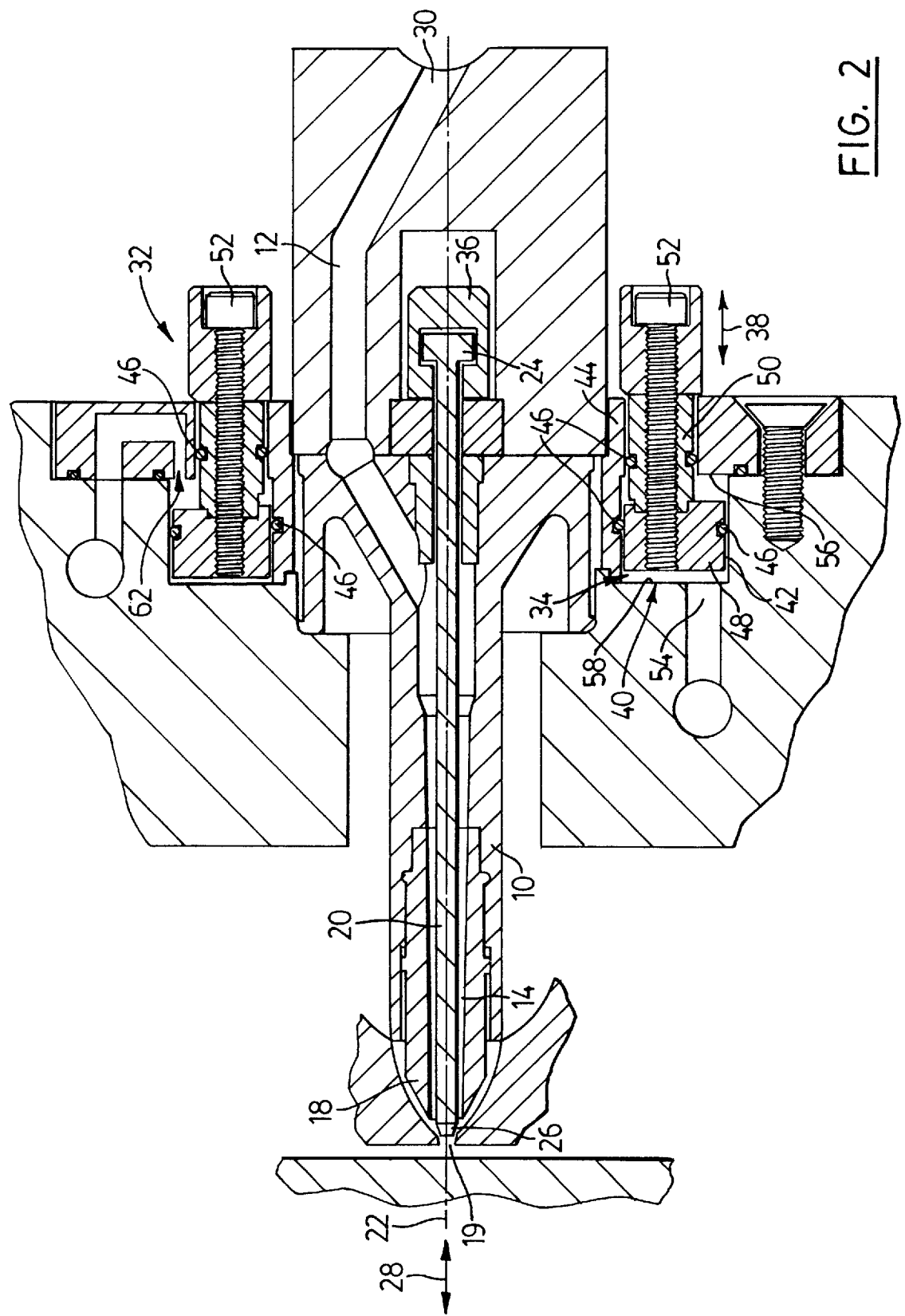
FIG. 2 is a section corresponding to line 2—2 of FIG. 1 of a first embodiment of the present invention.

As illustrated in FIG. 2, the valve pin 20 is movable back and forth along the pin axis 22 in the direction of arrows 28 between an open position and a shut position. In the open position, clearance exists between the lower end 26 of the valve pin 20 and a gate orifice 19 adjacent the nozzle tip 18 to permit melt flow through the gate orifice 18. In the shut position, the lower end of the valve pin 20 substantially seals the gate orifice 18 to prevent melt flow through the gate orifice 18.

The configuration illustrated in FIG. 1 is typical of a single cavity mold in which the melt passage 12 has an inlet 30 generally co-axial with the pin axis 22.

A valve pin actuator, generally indicated by reference 32, is provided to move the valve pin 20 between its open and shut positions. The valve pin actuator includes an annular piston 34 mounted in an annular bore 40 in FIGS. 2 and 3 (not shown in FIG. 1) and an actuator bar 36 extending generally diametrically across and rigidly secured to the piston 34.

The upper end 24 of the valve pin 20 is secured to the actuator bar 36 to constrain the valve pin 20 to move with the actuator bar 36. The annular piston 34 is movable in its bore 40, by pneumatic pressure, in the direction of arrows 38 in a direction generally parallel to the pin axis 22. Back and forth movement of the annular piston 34 in the direction of arrows 38 is therefore transferred by the actuator bar 36 to the valve pin 20 to cause the valve pin 20 to move between its open and shut positions.

The annular shape of the piston 34 and its bore 40 and the use of a diametrically extending actuator bar 36 provides ample room to accommodate a melt passage 12 configured to extend between the actuator bar 32 and the piston 34 to fluidly communicate with the bore 14 of the nozzle 10. This avoids having to locate the valve pin actuator 32 in the path of the melt thereby avoiding exposure of the valve pin actuator 32 to direct heating from the melt. Furthermore, the size of the annular piston 34 is generally unaffected by melt flow considerations, thereby enabling the annular piston 34 to be of a size to permit actuation by pneumatic rather than hydraulic means.

Figure 3:
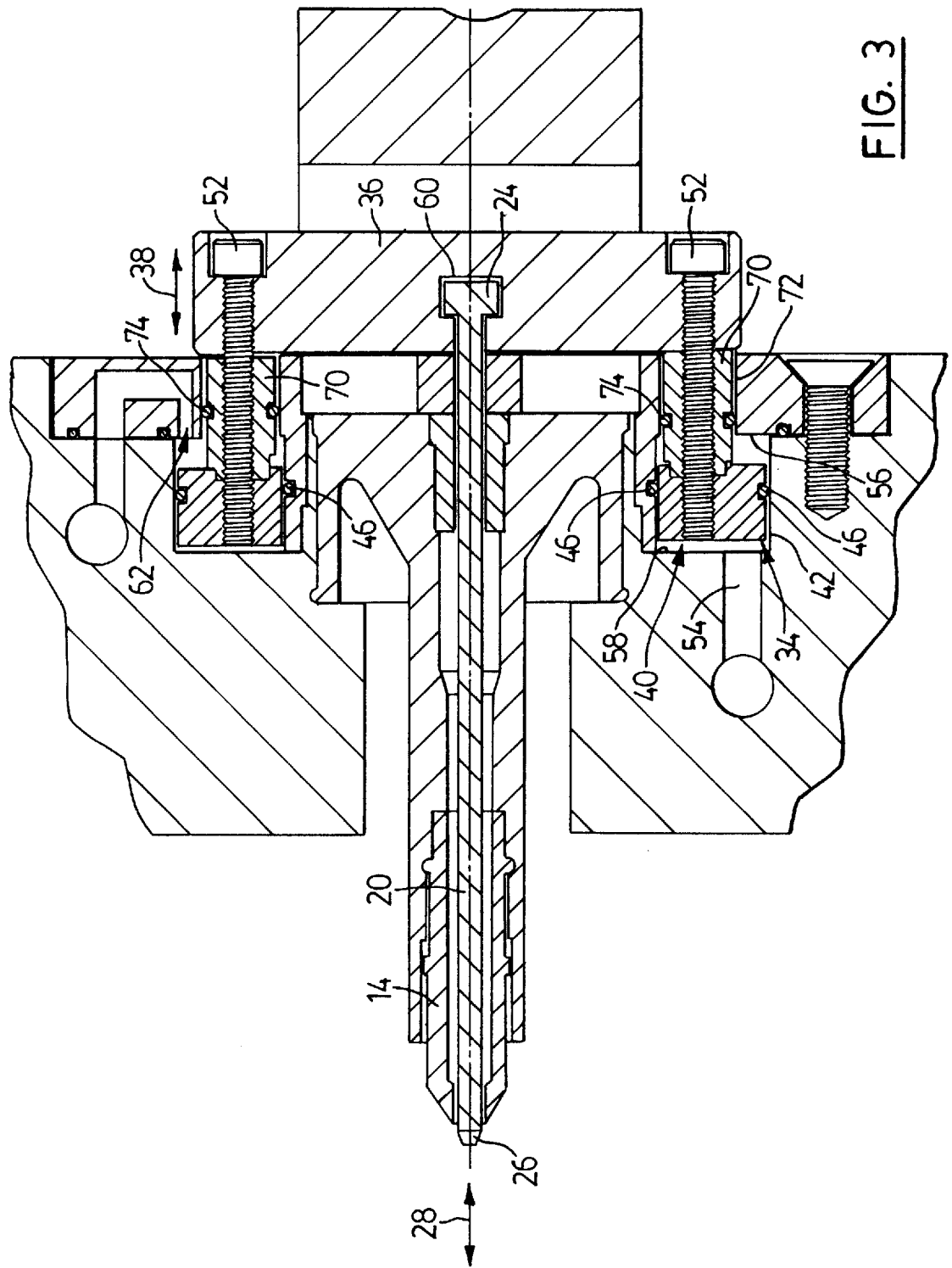
FIG. 3 is a section corresponding to line 3—3 of FIG. 1 of an alternate embodiment of the present invention.

In FIGS. 2 and 3, the piston 34 is shown mounted in an annular bore 40. The annular bore 40 may, in a first embodiment, have a broader inner portion 42 distal the actuator bar 36 and a narrower outer portion as shown at reference 44 adjacent the actuator bar 36. In an alternative embodiment as described in more detail below, the bore 40 may consist simply of a substantially enclosed chamber with cylindrical openings 72 in FIG. 3 enabling the actuator bar 36 to be secured to the piston 34.

In the first embodiment, the piston 34 has a broader portion 48 which slidably engages the broader portion 44 of the bore 40 and a narrower portion 50 which slidably engages the narrower portion 44 of the bore 40. Suitable seals such as "O" ring seals indicated by reference 46 may be used between the piston 34 and the bore 40 to ensure a fluid tight sliding seal therebetween. The actuator bar 36 may be secured to the piston 34 by fasteners such as indicated by reference 52.

The inner portion 42 of the bore 40 has an outer face 56 adjacent the outer portion 44 and an inner face 58 opposite the outer face 56. A first fluid inlet 54 is shown extending into the bore 40 through the inner face 58 to allow pressurized fluid, such as air, to be introduced into the bore 40 between the inner face 58 and the piston 34. This will cause the piston 34 to move away from the inner face 58 toward the outer face 56 to move the tie bar 36 to the right as shown in FIGS. 2 and 3.

The actuator bar 36 is connected to the upper end 24 of the valve pin 20 by a suitable connector such as a "T" shaped socket 60 which receives the correspondingly shaped upper end 24. The connector will cause the valve pin 20 to move along with the actuator bar 36 in the direction of arrows 28. Accordingly, when fluid is introduced through the first fluid inlet 54, the piston 40 and the actuator bar 36 will move the valve pin 20 to the right as illustrated thereby moving the valve pin into its "open" position.

A second fluid inlet 62 is shown as extending through the outer face 56 to admit pressurized fluid into the bore 40 between the piston 34 and the outer face 56. The introduction of pressurized fluid through the second fluid inlet 62 will cause the piston 34 and the actuator bar 36 to move to the left as illustrated thereby moving the valve pin 20 to the left toward its "shut" position.

The alternate embodiment is operationally similar to the first embodiment described above differing only in that the narrower outer portion 44 of the bore 40 and the narrower part 50 of the piston 34 are substituted respectively with diametrically opposed pair of cylindrical openings 72 in FIG. 3 referred to as a "connector guide" which slidably engage corresponding cylindrical "connectors" 70 in FIG. 3 extending between the actuator bar 36 and the piston 34. "O" rings 74 or other suitable sealing members may be used to form a substantially fluid tight slidable seal between the cylindrical connectors 70 and connector guides 72.

Figure 4:
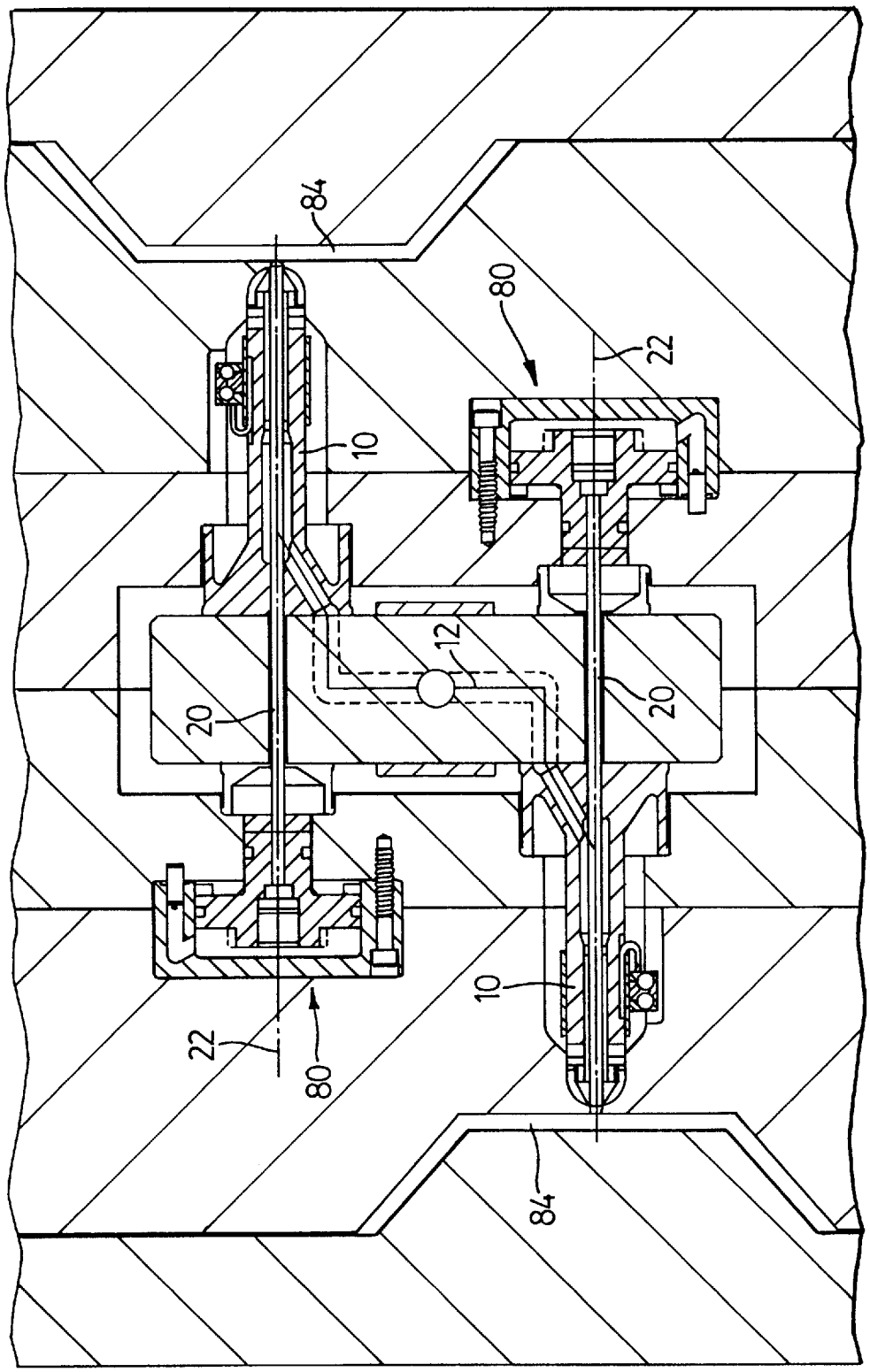
FIG. 4 is a sectional view through a typical prior art melt nozzle arrangement used with single cavity stack molds; and, FIG. 5 is a sectional view through a nozzle arrangement according to the present invention for use with single cavity stack molds.

FIG. 4 illustrates the use of conventional pin actuators, generally indicated by reference 80, in a stack mold arrangement. Each of the valve pins 20 associated with respective nozzles 10 is actuated by a respective actuator 80. The height of each actuator 80 requires that the nozzles 10 be staggered one above the other rather than "back-to-back" with the pin axes 22 coaxial. This produces undesirable bending moments in the mold structure as respective parts 84 are correspondingly staggered one above the other and the forces arising from mold filling will not cancel each other because of the staggered arrangement.

Figure 5:
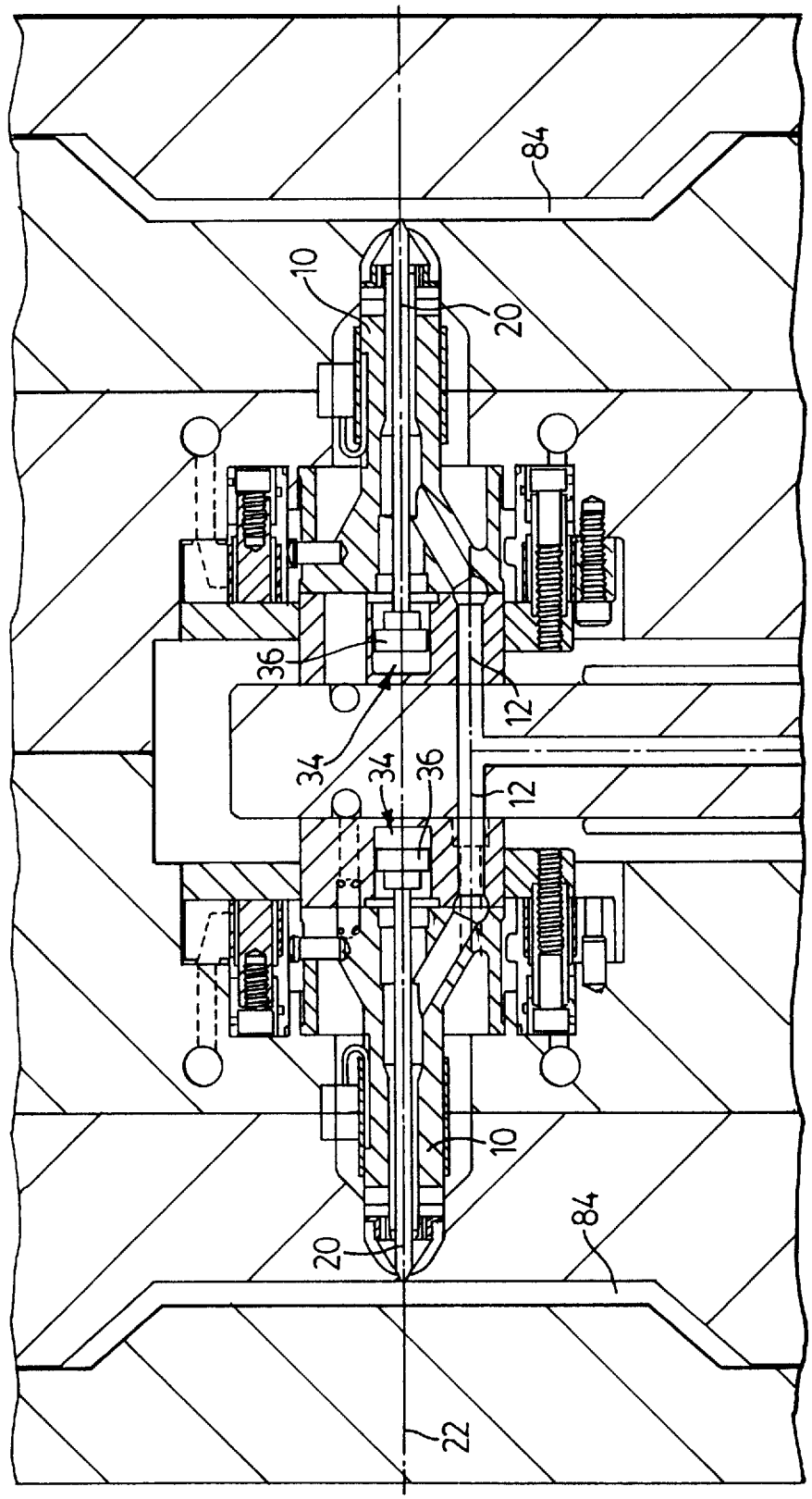

FIG. 5 illustrates the improved stack mold arrangement possible with valve pin actuators 32 according to the present invention. The relatively low height of the valve pin actuators 32 enables the nozzles 10 to be arranged "back-to-back" with the pin axes 22 coaxial thereby avoiding undesirable bending moments.

The above description is intended in an illustrative rather than a restrictive sense. Variations to the exact arrangements described above may be apparent to those skilled in the relevant art without departing from the spirit and scope of the claims set out below.

I claim:

1. A valve pin actuator for a valve-gated injection molding system having an injection molding nozzle and a generally co-axial valve pin extending along an inner bore of said nozzle, said valve pin being movable relative to said injection molding nozzle along a pin axis between open and shut positions, said valve pin actuator comprising:

an annular piston mounted in and movable, by pneumatic pressure, back and forth along an annular bore in a direction generally parallel to said pin axis, said annular piston extending radially outwardly of any melt passages which fluidly communicate with said injection molding nozzle; and an actuator bar secured to and extending substantially diametrically across said annular piston, said actuator bar having a T-shaped socket for receiving a similarly shaped upper end of said valve pin to connect said valve pin to said actuator bar and cause said valve pin to move back and forth along with said annular piston between said open and shut positions, said upper end of said valve pin extending beyond an outer end of said nozzle.

2. A valve pin actuator as claimed in claim 1 wherein:

said annular bore has a broader inner portion distal said actuator bar and a narrower outer portion adjacent said actuator bar;

said piston has a broader part slidably engaging said broader portion of said annular bore in a substantially fluid sealed manner and a narrower part slidably engaging said narrower portion of said annular bore in a substantially fluid sealed manner;

said inner portion of said annular bore has an outer face adjacent said outer portion and an inner face opposite said outer face;

a first fluid inlet fluidly communicates with said inner portion of said annular bore adjacent said inner face of said annular bore through which pressurized fluid may be introduced to cause said piston to move toward said outer face in turn causing said actuator bar to move said valve pin toward said open position; and, a second fluid inlet fluidly communicates with said inner portion of said annular bore adjacent said outer face of said annular bore through which pressurized fluid may be introduced to cause said piston to move away from said outer face in turn causing said actuator bar to move said valve pin toward said shut position.

3. A valve pin actuator as claimed in claim 1 wherein:

said annular bore has an outer face toward said actuator bar and an inner face opposite said outer face;

said piston slidably engages said annular bore in a substantially fluid sealed manner between said inner and outer faces;

a connector extends between said piston and each end of said actuator bar, each said connector having an axis generally parallel to said pin axis;

each said connector slidably engages, in a substantially fluid sealed manner, a respective connector guide extending away from said outer face toward said actuator bar;

a first fluid inlet fluidly communicates with said annular bore to admit pressurized fluid between said inner face and said piston to cause said piston to move away from said inner face thereby causing said connector and said actuator bar to move said valve pin toward said open position; and a second fluid inlet fluidly communicates with said annular bore to admit pressurized fluid between said outer face and said piston to cause said piston to move away from said outer face thereby causing said connector and said actuator bar to move said valve pin toward said shut position.

* * * * *